Jan. 18, 1944. L. V. WHISTLER ET AL Re. 22,422

PERFORATING PUNCH AND DIE ASSEMBLY Orig. 2212,678

Original Filed April 14, 1939 3 Sheets-Sheet 1

Lawrence V. Whistler
Sanford A. Whistler
Inventors,
By Emil Kuehnert
Attorney.

Jan. 18, 1944. L. V. WHISTLER ET AL Re. 22,422

PERFORATING PUNCH AND DIE ASSEMBLY

Original Filed April 14, 1939 3 Sheets-Sheet 2

Lawrence V. Whistler
Sanford A. Whistler
Inventors,
By Emil Neuhard
Attorney.

Jan. 18, 1944. L. V. WHISTLER ET AL Re. 22,422

PERFORATING PUNCH AND DIE ASSEMBLY

Original Filed April 14, 1939 3 Sheets-Sheet 3

Lawrence V. Whistler
Sanford A. Whistler } Inventors,

By Emil Kuehert
Attorney

Reissued Jan. 18, 1944

Re. 22,422

UNITED STATES PATENT OFFICE 22,422

PERFORATING PUNCH AND DIE ASSEMBLY

Lawrence V. Whistler and Sanford A. Whistler,
Kenmore, N. Y.

Original No. 2,212,678, dated August 27, 1940,
Serial No. 267,810, April 14, 1939. Application
for reissue July 6, 1942, Serial No. 449,958

9 Claims. (Cl. 164—118)

This invention relates to a perforating punch and die set, or punch and die assembly, as it may be termed.

Heretofore it has been difficult to acquire perfect alinement of the die with respect to the punch, with the result that the proper concentric clearance between the punch and die could not be assured. Such clearance to be effective should approximate seven to eight per cent of metal thickness, and a variation in the axes of the punch and die of one-half of such clearance would result in the punch contacting with the wall of the die, thereby causing friction which would wear out the punch and die cutting-edges and also cause undesirable burrs to be formed on the stock being perforated.

Having in mind to overcome such objectionable features, it is one of the objects of our invention to provide a punch and die assembly in which the axis of the punch is assured coincidence with the axis of the die, with the result that the punch will enter the die with exactly the same clearance between the cutting-edge of the punch and the cutting-edge of the die at all points in the circumference of the punch.

Another object of our invention is to simplify the making of punch and die assemblies from a cost standpoint with the assurance otherwise impossible to obtain of establishing axial or concentric alinement between the two members of a punch and die device or implement, and also to avoid wearing out of the punch and die cutting-edges under friction, now so common in the operation of punch and die devices.

Another object of our invention is to provide securing blanks for the punch and die, which will also serve as pilots, whereby it is possible to provide perfectly coinciding pin or shank-receiving openings in the punch and die holder plates of a punch and die assembly capable of being formed therein while such plates are maintained in the registering relation in which they would be used in the act of punching metallic sheets or other sheet material, such plates serving as templates.

It is also an object of our invention to have the securing shanks or pilots of the punch and die of the same diameter so that the pin or shank-receiving openings in the punch and die holder plates can be formed with a single drilling and boring or forming operation.

It is also an object of our invention to provide a die-device comprising two metallic parts of different densities or hardness, one of which serves as the body portion of foundation of the die device and the other as the die proper, or die-bushing as it may be termed, the fundation or body portion, or the die-holder as it may be termed, being utilizable with die-bushings having punch-receiving holes of different diameters so that die-bushings can be applied to standard foundations or body portions in conformity with the punches to be used in connection therewith. It is thus of advantage to use as the foundation or body portion a malleable or other casting or a machined part and suitably connect therewith a steel or other hardened die-bushing of desired size, the punch hole in the die-bushing having in all instances a diameter which does not exceed that of the plug passage formed through the foundation or body portion and invariably having its punch hole of smaller diameter than said plug passage.

A further object of our invention is to cast the foundation or body portion of the die-device of malleable or other comparatively soft iron, or machine the same from bar stock while the die-bushing or die proper is formed of tool-steel or other hardened metal and brazed, hydrogen-welded, or any other means employed for securing the die-bushing to the foundation or body portion to make the die-bushing substantially an integral part thereof.

With the above and other objects in view to appear hereinafter, our invention consists in the novel features of construction and in the arrangement and combination of parts to be hereinafter described and more particularly pointed out in the subjoined claims.

Referring to the figures of the drawings—

Figure 12:
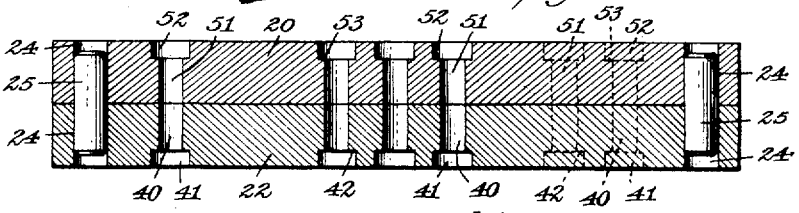

Fig. 12 is a view of the punch and die-holder plates or templates assembled and retained in proper relation by dowel pins, such as employed for properly positioning the said plates within the press and showing the method of forming the pin or shank-receiving openings in said plates whereby the pins or shanks of the punch and die device are assured true coinciding relationship, to the end that the length of the life of the punch and die will be greatly augmented and all burrs, often formed on metal punched, will be eliminated.

Now referring to the drawings in detail, the reference numeral 15 designates the shoe of a die-set to be placed in a press in the usual manner and which may be secured to the bed or table of the latter. Said shoe has rising therefrom several guide rods 16 over which ride guide bosses 17 formed on a ram or punch holder 18 fastened by means of a stud 19 or otherwise into the ram of a press arranged to reciprocate toward and from the bed or table of the press.

Figure 1:
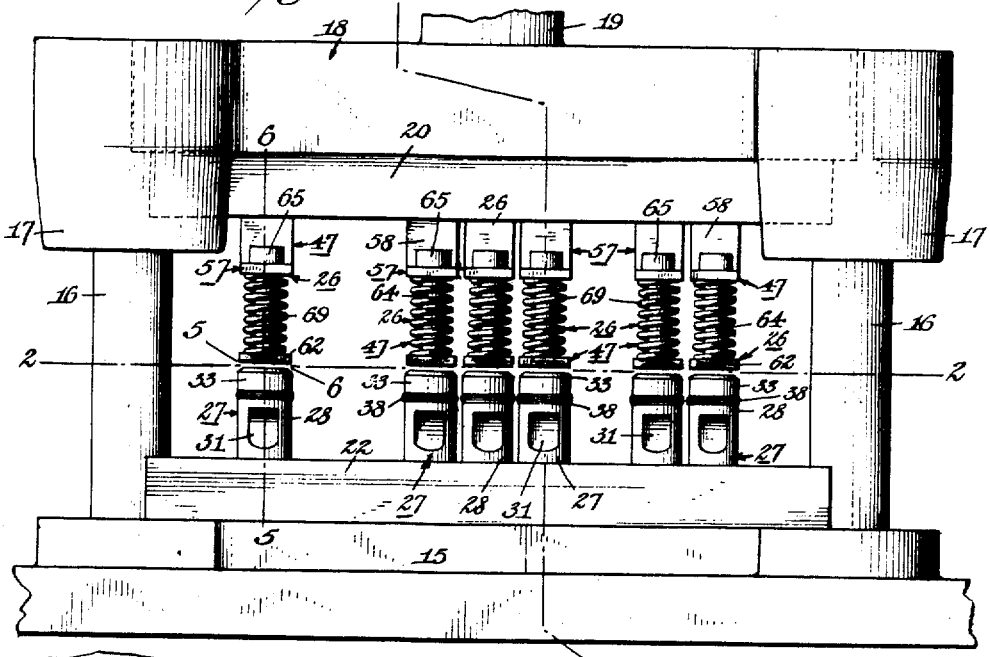
Fig. 1 is a front elevation of a punch and die set or assembly shown in association with a portion of a press of the conventional type, the die-set having a die shoe and a punch holder adapted to be mounted on or secured to the table and the ram of the press, respectively.
Figure 2:
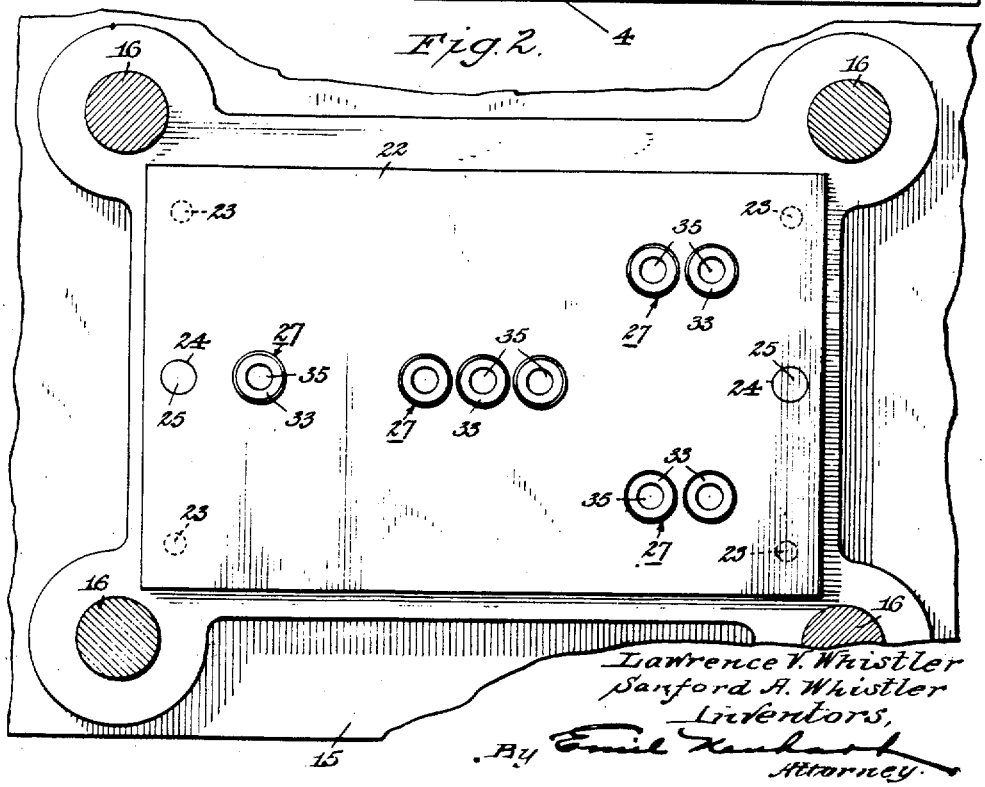
Fig. 2 is a horizontal section taken on line 2—2, Fig. 1, looking down.
Figure 3:
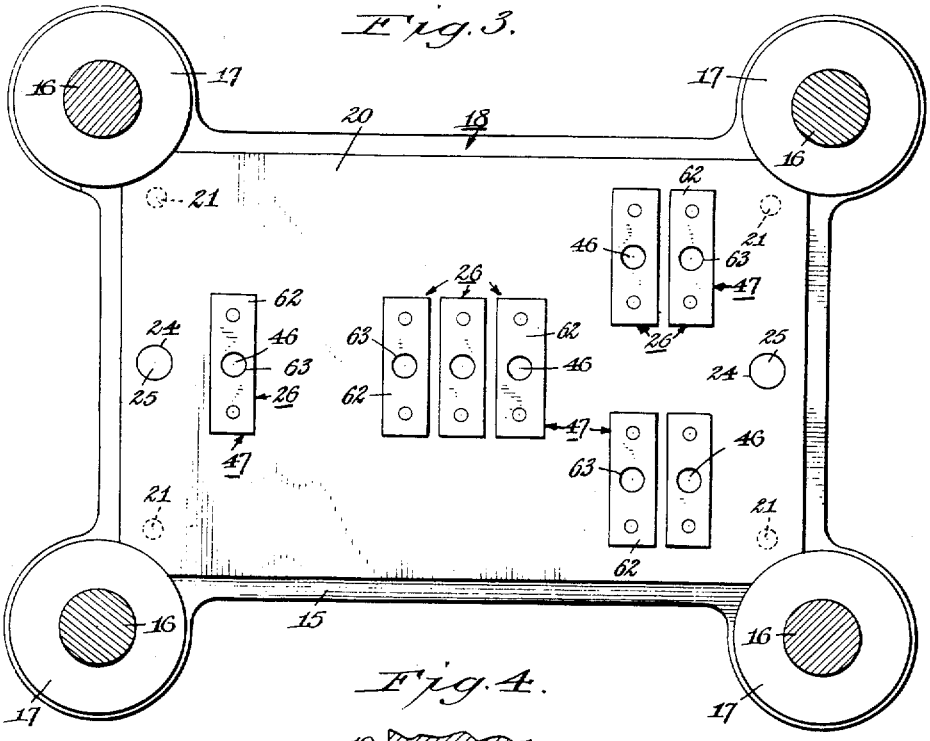
Fig. 3 is a similar horizontal section, looking up.
Figure 4:
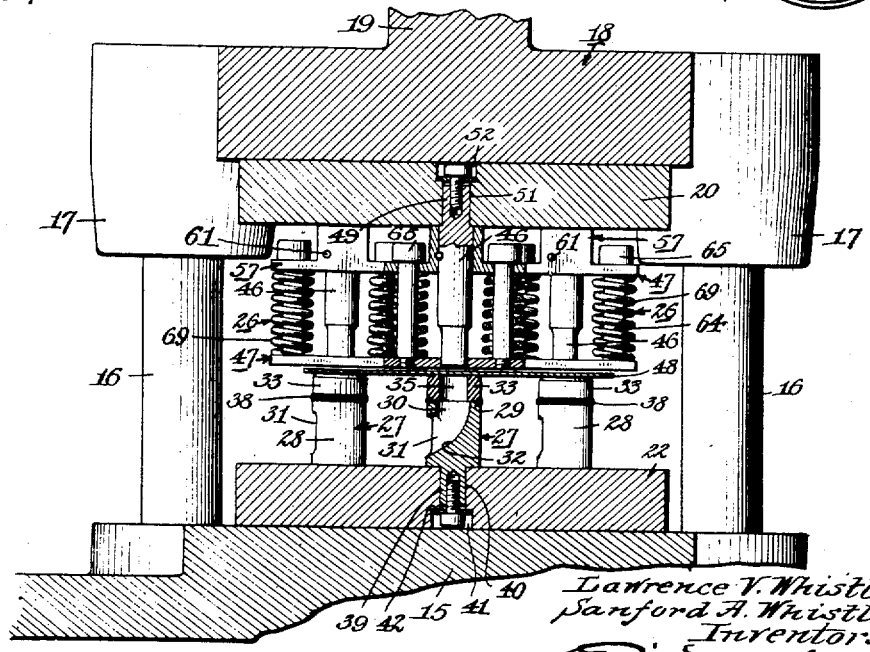
Fig. 4 is a vertical section taken on line 4—4, Fig. 1, looking to the right, part of the die shoe being broken away.

Fastened to the under side of the punch holder 18 is a punch holder-plate or template 20, which may be of any desired thickness; screws, bolts, or other fastening means for this purpose being shown in dotted lines at 21, Fig. 3. A die-holder plate or template 22 also of any desired thickness is mounted on the die shoe 15 and this is also fastened in place by means of screws, bolts, or other fastening devices indicated by dotted lines 23 in Fig. 2.

We have shown the punch holder-plate or template and the die holder-plate or template of exactly like dimensions so that these may be placed one over the other with their edges in perfect registration. Dowel pin openings 24 may be formed in these holder-plates or templates while one surmounts the other, or these openings may be formed under other conditions; and registering openings may be formed in the punch holder and die shoe so that dowel pins 25 may be driven through the punch and die holder-plates or templates and enter the ram or punch holder 18 and the die shoe of the die-set, respectively. It is of course necessary to have the dowel pin openings 24 in the punch and die holder-plates or templates register with openings in the ram or punch holder and die shoe of the die-set so that these plates or templates may be positioned properly before securing them in place. We prefer to form the dowel pin openings 24 in the punch and die holder-plates or templates when they are mounted one on the other, as shown in Fig. 12, so that two of the dowel pins 25 may be driven into said openings 24 for positioning the plates or templates in registering relation.

26 designates the punch devices, considered as a whole, and 27 the die devices, both constituting die-implements. Each die-device 27 comprises a die-holder or body portion 28 cast of malleable or other durable and inexpensive material, it being preferably cylindrical in cross section and chamfered at its upper edge, as at 29. Said die-holder or body portion has a cylindrical slug-receiving opening 30 formed therein from its top and a lateral slug-discharge opening 31 intersecting said cylindrical opening and having an inclined rider wall 32 merging into the cylindrical wall of the slug-receving opening 30.

Figure 5:
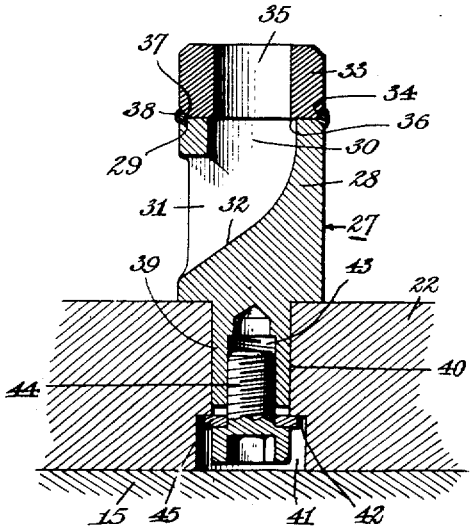
Fig. 5 is an enlarged vertical section taken on line 5—5, Fig. 1.
Figure 6:
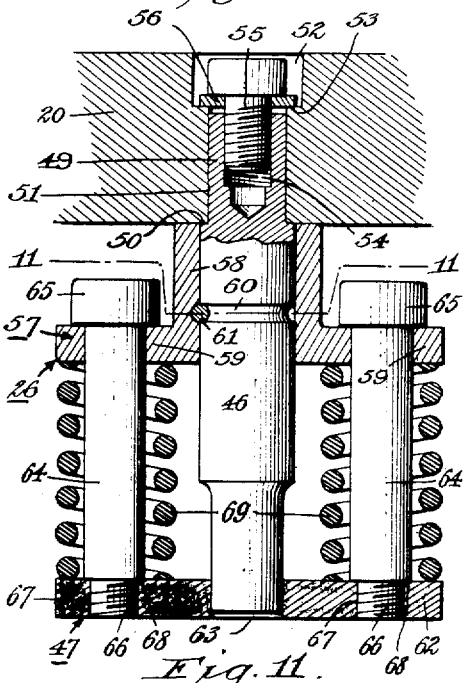
Fig. 6 is an enlarged vertical section taken on line 6—6, Fig. 1.

33 designates the die-bushing or die proper which is formed of steel or other hard material, and it is externally chamfered at its lower edge, as at 34 (see Fig. 5). This die-bushing has a punch hole 35 formed axially therein which, if cylindrical, does not exceed in diameter that of the cylindrical slug-receiving opening 30 in the die-holder 28 and invariably is smaller in diameter so that a portion of the die-bushing overhangs the said cylindrical slug-receiving openings 30, as at 36.

When mounting the die-bushing 33 on the die-holder or body portion 28 of the die-device with the axes of both coincident, a V-shaped external groove is formed at the parting line, designated 37 in Fig. 5, into which groove welding flux 38 may be placed while in the act of welding the die-holder and die-bushing together. In this manner the die-bushing and die-holder or body portion of the die-device are made practically integral; but any other manner of rigidly connecting the die-bushing to the die-holder or body portion may be employed, even though all of the advantages of hydrogen-welding are not thus retained.

It will be apparent from the foregoing that the die-holders 29 may, within certain limits, serve as foundations or bases for die-bushings having punch openings of various sizes or outlines so that die-bushings, regardless of the type of punch-holes therein, may be secured to body portions which do not vary from each other in any respect or any dimensions at any point, even though the die-bushings are of like or different sizes internally and to an extent externally. The die-holders may, of course, be of various size ranges. The die-holder or body portion 28 is reduced in diameter at its lower end to form a securing shank 39 which serves also as a pilot, and this shank or pilot snugly fits into a bore or hole 40 formed in the die holder-plate or template 22. The shoulders formed by reducing the lower ends of the die holders or body portions 28, whereby the pilot pins 39 are created, serve as bearing faces or surfaces perpendicular to the axes of said die holders, and are designed to bear against the adjacent face of the plate or template to which said die holders or body portions are attached. Any of several well known means for fastening the die holders 28 to their cooperating plate or template may be employed after inserting the pilot pins or shanks 39 into the holes in said plate or template; but preferably the hole or bore 40 is counterbored at its lower end or at the bottom of the die holder-plate or template, as at 41, thereby forming a downwardly-facing shoulder 42. The smaller portion of the hole 40 is slightly longer than the shank or pilot 39 of the die device, and said shank or pilot is provided with an axial screw-threaded bore 43 into which is threaded a cap screw 44. Between the head of said cap screw and the shoulder 42, a washer 45 is placed which, when the screw is tightened, is forced firmly against said shoulde", thus causing the shank or pilot 39 to be tightly threaded within the hole or bore 40 and the bearing face or bottom of the die-holder or body portion 28 to be drawn tightly against the upper surface of the die holder-plate or template 22. It is to be noted that the shank or pilot 39 is coaxial with the punch opening 35 in the die-bushing 33.

Cooperating with the die-device is the punch device 26, which comprises a punch 46 and stripper means 47 whereby the sheet-metal to be punched, designated by the numeral 48, is stripped from the punch after being perforated by the latter. This punch is in the form of an elongated cylindrical member reduced in diameter at its upper end to form a securing shank 49 which also serves as a pilot. It may also be reduced along its lower portion, if desired, to conform in diameter to the punch opening 35 in the die-bushing 33 cooperating therewith; sufficient clearance of course being provided by infinitesimal variation in the diameters of said punch opening and punch. By reducing the upper end of this punch an upwardly-facing shoulder or bearing face 50 is formed thereon which is perpendicular to the axis of the punch. Like the die holder 28, this punch device may be fastened to the punch-holder plate or template 20 by any means now commonly employed for that purpose; but preferably the punch holder-plate or template 20 is provided with a bore or hole 51 counterbored at its upper end, as at 52, to form an upwardly-facing shoulder 53, the length of the smaller portion of the bore or hole 51 being somewhat greater than the shank 49. This shank or pilot is provided with a threaded bore 54 adapted to receive a cap screw 55, between the head of which and said shoulder 53 a washer 56 is arranged. Upon tightening said cap screw, the punch will be drawn firmly up into the bore of the punch-holding plate or template until said shoulder or perpendicular face 50 of the punch bears tightly against the under side of said plate.

The stripper means 47 comprises a head 57 having a sleeve 58, from the lower end of which arms 59 project radially in opposite directions, said sleeve being positioned on the punch and fastened thereto in any suitable manner. We, however, have shown the punch provided with a circumferential groove 60 into which is fitted a pin 61 driven through said sleeve, the fastening means comprising said groove and pin enabling the pin to be passed through the sleeve and entered in the groove regardless of the rotary position of said punch or the stripper means.

Associated with said stripper head 57 is a stripper bar 62 which is spaced from and arranged parallel with said head and it is provided centrally between its ends with an opening 63 in which the lower or punch end of the punch is normally retained. Slidably arranged in the arms 59 of the stripper head are combined retainer and guide-pins 64 having heads 65 at their upper ends. Said pins are reduced in diameter at their lower ends and threaded, as at 66, into threaded openings 67 formed in the stripper bar. The shoulders 68 formed by reducing the lower ends of the said combined retainer and guide-pins bear against the upper side of the stripper bar. Surrounding each of these pins are spiral springs 69 which exert their force against the under side of the stripper head 57 and the upper side of the stripper bar 62, the heads 65 of said pins serving as stops to limit the downward movement of the stripper bar.

It will be apparent that by reason of the shank or pilot of the punch 49 and the shank or pilot of the die being of equal diameter, the holes or bores receiving them can be formed in one operation by mounting the punch holder-plate or template, on the die holder-plate or template, or reversely; this being accomplished by forming the counterbored portions of said bores from the opposite exposed faces of said plates and then continuing the normal size of the bores in which the pilot pins or shanks of the punch and die are to be fitted, or this can be accomplished in any other approved manner, so long as both shank-receiving holes or bores are drilled or otherwise formed while said plates are placed together, as clearly shown in Fig. 12. It will of course be of advantage to first drill or otherwise form the dowel pin openings 24 in the plates or templates, after which the plates or templates may be retained in their superimposed positions by means of the dowel pins 23, used for that purpose; or by having other dowel pins of the same diameter for preventing movement laterally or endwise of said plates or templates while superimposed. In the drawings we have shown the punch holder-plate and the die holder-plate or template of exactly the same dimensions, but where the dimensions differ in one plate or template from that of the other they may be mounted one on the other and so retained in any approved manner, so long as the shank-receiving openings 24 in the plates or templates are drilled or otherwise formed through both plates while so maintained. The shank-receiving holes or bores for the punch and die devices are, therefore, of the same diameter in both plates, and since the shanks or pilots of both the punch and die devices are preferably of like diameter and fit snugly into the shank-receiving holes or bores, assurance is had that when placing said plates within the press or other machine employed for punching sheet-metal or other similar stock, a true and perfect alinement of the punches and dies will be had; it, of course, being understood that the punch holes in the die-bushings have their axes in true alinement with the axes of the shanks or pilots of the die-devices of which said die-bushings form part. It may also be stated that by reason of the lateral opening formed in each of the die-devices, the slugs or other elements punched from the sheet-metal or other stock being operated upon are delivered onto the die holder-plate or template and can be easily removed as they accumulate.

Figure 7:
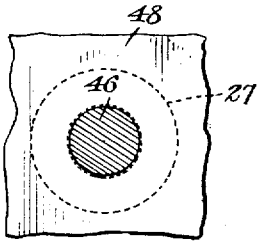
Fig. 7 is a diagrammatic view, including a section of a punch, a portion of a piece of sheet-metal to be punched thereby, and showing in dotted lines the die underneath the sheet-metal and its true relation to said punch as provided for under our improved method of setting up the punch and die device.
Figure 8:
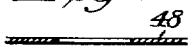
Fig. 8 is a sectional view of the piece of metal shown in Fig. 7 after punching the same under the relationship provided between the punch and die illustrated in said figures.

With this invention assurance is had that each punch will be concentric to the punch hole in the die-device with which the punch cooperates, as clearly shown in Fig. 7, and for a clean-cut and perfect punch operation—say for example in punching $^{50}/_{1000}$ steel—clearance between the punches and dies should approximate $^{3}/_{1000}$ of an inch. Holes punched through such stock will have clean-cut walls without any burrs or other rough edges being formed, and this is clearly illustrated in Fig. 8.

Figure 9:
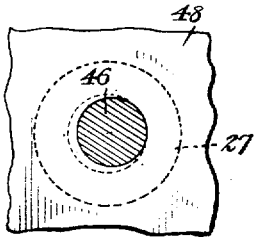
Fig. 9 is a view similar to Fig. 7 showing the relationship between the punch and die often existing under present-day punch and die sets or assemblies, showing the punch and die out of true coincidence and according to which the punch is forced into the die-bushing off center.
Figure 11:
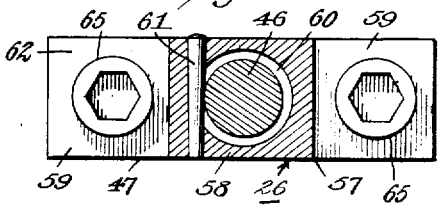
Fig. 11 is a horizontal section taken on line 11—11, Fig. 6.
Figure 10:
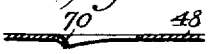
Fig. 10 is a sectional view of the piece of metal shown in Fig. 9 after punching the same under the relationship existing between the punch and die illustrated in said figure and showing a burr formed on the sheet-metal around one-half of the wall of the punch hole therein.

In Fig. 9 we have illustrated a condition commonly existing in punch presses by reason of the fact that the punch has its axis slightly out of alinement with the axis of the die cooperating therewith. This results in the punch entering the die off center, oftentimes with the punch coming in contact with the wall of the punch hole in the die at one side of its center, while the clearance at the other side of the center is increased to 7/1000 of an inch, thereby causing at least rubbing action or friction between the punch and die walls. The punch and die cutting edges become worn away under such conditions, causing a rough wall to be formed in the punched hole at one side of its center. When punches and dies so mutilated are used, the sheet-metal is pressed downwardly at that side of the center where the increased clearance space is provided and causes a burr to be formed, as clearly shown at 70, Fig. 10. This results in imperfect work, calls for frequent replacement of punches and dies, and necessitates further operations on the punched sheet-metal or other stock in order to dispose of the burrs projecting from the punched holes therein.

For accurate work such punched material is not acceptable, even though the burrs be finally reduced or eliminated by hammering or other operations, since such operations would not assure perfect outlines for the punch holes in the metal. It will be clear that any attempt to straighten out burrs on the wall of a round punched opening in sheet-metal by a hammering operation would result in an opening being formed that would be more or less oval, and in any event would not be truly circular, and this distortion of the punch hole would occur regardless of the cross sectional formation of the punch and the punch hole in the die-bushing, since the same difficulty would be encountered with any other form of punched hole formed under like circumstances.

We regard the formation of shanks or pilots of like diameters on the punch and die devices or implements of marked importance in a punch and die assembly or mechanism, for the reason that the holder-plates, carrying members, templates, or otherwise named parts of the punch and die assembly receiving said shanks or pilots can be drilled or otherwise manipulated to form the receiving holes or openings for said shanks or pilots with one operation of a drill or other suitable tool, and thus assurance be had of so positioning the punch and die that the axes of both are coincident and that the clearance between the punch and the punch hole in the die-device will be the same at every point of the circumference of the cutting edges of both the punch and the die-device. Therefore, the drilling of such holes or openings, whether of the same or different diameters, so long as they are axially coincident, establish the punch and die holder plates as templates and are necessarily used as such.

We further regard the employment of a die-holder or body portion for the die-device constructed of any suitable metal for use in connection with die-bushings of various-sized punch holes as of considerable importance, since it enables various sizes of punches to be used in connection with mating die-bushings on a die-holder or body portion having a definite size and shape. This is particularly true in view of the provision made for securely fastening the die-bushing to the die-holder or body portion of the die-device, especially when the die-bushing is brazed, welded or otherwise permanently connected together; thereby providing means to make the die-bushing a rigid part of or substantially integral with the die-holder or body portion of the die-device.

We also wish to stress the fact that by reason of merging the wall of the lateral opening in the body portion or die-holder with the peripheral wall of the cylindrical axial opening in the upper end thereof, the inclined rider face so formed will prevent clogging of the slugs cut or punched from the sheet-metal or other stock within the body portion or die-holder. This rider face, as is clearly shown in Fig. 5, is formed in an arc of a circle at least along a portion of its length, so that when the slugs drop thereon, diametrically opposite points of the slugs contact the concaved wall and thus minimize the friction between said wall and the slugs. Free sliding motion for the slugs through the lateral discharge provided therefor is assured. Moreover, the particular arrangement of the punch and die device shown and described enables punch openings to be formed in sheet-metal or other sheet material with much closer centers than heretofore possible.

The lateral discharge opening provided in the body portion or die holder of each die-device, whereby the punched out slugs are delievered laterally onto the die holder-plate or template, eliminates the slug passages usually formed through said plate and also through the die shoe and the table of the press, depending on the type of press employed. It will therefore be apparent that a die holder-plate or template for one job may serve for all other jobs within a given area, since the form of shank-receiving holes or openings therein will not, in most cases, interfere with forming other shank-receiving openings in the die holder-plate or template, while absolutely no openings will at any time be necessary in the die shoe and the bed or table of the die-set or press.

It will be apparent, therefore, that from the very nature of the structure, the plates or templates may be used for other sets of punch or die implements spaced differently than those last used in conjunction with said plate or templates; or, said punch and die implements may be removed from said plates or templates and the punch and die implements attached to other prepared plates or templates under a different set-up or arrangement while storing said plates in the form prepared for future use; also that the punch-holder plate or template and the die-holder plate or template with their respective punch and die devices attachd thereto may each be removed from the die-set as a unit.

By providing the punch and die devices or implements with axial shanks, which also serve as pilots, and fitting them into axially-alined holes or apertures in the punch and die holder plates or templates, all outstanding flanges usually employed on punch and die devices for securing them in place are dispensed with and punch and die devices or implements in any desired number may be secured to said plates or templates in considerably closer relation to each other than has heretofore been possible. While this, in many instances, is of advantage, any common means of fastening the punch and die devices or implements to the plates or templates, such as outstanding flanges or lateral extensions formed thereon (shown for instance in our Patent No. 1,939,478), or otherwise, may be employed, although the holes or perforations in the workpiece to be operated upon cannot be so closely spaced as with the particular construction herein shown and described.

Where, in the claims, reference is made to plates, it shall include material of any thickness and kind, since in all instances the plates have one main purpose, and that is to position each punch device or implement in axial alinement with its co-acting die-device or implement. Therefore, the plates or members against which the die and punch implements are rigidly and removably held serve as templates, regardless of their thickness, as well as punch and die holder-plates.

Having thus described our invention what we claim is:

1. In a punch and die assemblage, a punch holder-plate having an opening therein, a die holder-plate spaced from said punch holder-plate and having an opening therein in axial alinement with and of a diameter corresponding to the opening in said punch holder-plate, a punch having a shank fitted into the opening in said punch holder-plate with its axis coincident with that of said opening, a die-device having a shank fitted into the opening of said die holder-plate and of a diameter corresponding to the diameter of the shank of said punch, said die-device having a slug-discharge opening to deliver slugs therefrom punched from sheet-stock, and means axially engaging and securing the shanks of said punch and said die-device in said openings.

2. In a punch and die assemblage, a spaced apart punch and die holder-members provided with vertical axially-alined openings of like diameter permitting both openings to be formed simultaneously when placing one of said members against the other, means for securing said holder members in operative separated positions and in which said openings are retained vertically axially alined, punch and die devices having securing shanks of like diameters and corresponding in diameter to that of the openings in said punch and die holder-members, said securing means for said holder-members being independent of said punch and die devices, said shanks having axial screw-threaded bores, a securing screw threaded into the shank of said punch device from the upperside of said punch holder-member, and a securing screw threaded into the shank of said die device from the under side of said die holder-member, said die-device having a slug-discharge opening to deliver slugs therefrom punched from sheet-stock.

3. In a punch and die assemblage, a punch holder-plate adapted to bear with its upper side against a punch shoe and having an opening bored therethrough counterbored at its upper end to form an upwardly-facing shoulder in said opening, a punch having its upper end reduced in diameter to form a securing shank and to provide an upwardly-facing shoulder at the base of said securing shank, said shank being fitted in said opening and having an axial threaded bore formed therein opening at the upper end of said shank, a washer in the counterbored portion of said opening bearing against the upwardly-facing shoulder therein, and a cap screw passed through said washer and threaded into the bore of said shank, said cap screw having its head bearing against said washer and being wholly within the counterbored portion of said opening.

4. In a punch and die assemblage, a die holder-plate adapted to bear with its under side against a die-shoe and having an opening bored therethrough counterbored at its lower end to form a downwardly-facing shoulder, a die-device having its lower end reduced in diameter to form a securing shank and to provide a downwardly-facing shoulder at the upper end of said securing shank, said shank being fitted in said opening and having an axial threaded bore formed therein opening at the lower end of said shank, a washer in the counterbored portion of said opening bearing against the downwardly-facing shoulder therein, and a cap screw passed through said washer and threaded into the bore of said shank, said cap screw having its head bearing against said washer and being wholly within the counter-bored portion of said opening, said die-device having a slug-discharge opening to deliver slugs therefrom punched from sheet-stock.

5. A die-device comprising a body portion of cast metal having a slug opening extending downwardly from its upper end and continued laterally to one side of said body portion, and a die-bushing of hardened metal mounted on said body portion and peripherally welded thereto to form a substantially integral device constructed of two different metals.

6. A die-device comprising a body portion of cast metal having a slug opening extending downwardly from its upper end and continued laterally to one side of said body portion, said body portion having means to axially secure the same within a die holder-plate, and a die-bushing of hardened metal mounted on said body portion and welded thereto to form a substantially integral device constructed from different metals.

7. In a punch and die assemblage, co-operating punch and die holder members normally spaced apart and having co-axial openings therein of a given diameter and adapted to interchangeably receive correspondingly formed and sized parts of punch and die devices of varying sizes, combined with a punch device having a punch of selected size provided with a shank secured in and of a size to fit the opening in said punch holder member, a die device having a die provided with a punch hole serving as a mate to said punch and provided with a shank secured in and of a size to fit the opening in said die holder member, means axially securing the shank of said punch from the upper side of said punch holder member, and means axially securing the shank of said die device from the under side of said die holder member, said axial securing means being wholly within said punch and die holder members to enable said members to bear fully against parts to which they may be fastened.

8. A die device comprising a body portion having a slug passage therethrough from its upper surface and provided with a peripherally chamfered upper end, a die bushing of hardened metal mounted on said body portion and provided with a peripherally chamfered lower end co-operating with the chamfered portion of said body portion to form a peripheral V-shaped groove in the plane of the contacting surfaces of said body portion and die bushing, and welding flux applied in said V-shaped groove to secure said die bushing to said body portion.

9. A die device comprising a body portion of suitable cast or other metal having a slug opening extending downwardly from its upper end, and a die bushing of hardened metal mounted on said body portion and secured thereto to form a substantially integral device constructed of two different metals.

LAWRENCE V. WHISTLER.
SANFORD A. WHISTLER.